(12) United States Patent
Ishikawa

(10) Patent No.: US 6,657,673 B2
(45) Date of Patent: Dec. 2, 2003

(54) METHOD AND APPARATUS FOR DETECTING AND RECORDING IMAGES

(75) Inventor: Yoshihiro Ishikawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/747,946

(22) Filed: Dec. 27, 2000

(65) Prior Publication Data
US 2001/0005230 A1 Jun. 28, 2001

(30) Foreign Application Priority Data
Dec. 27, 1999 (JP) .......................................... 11-368799

(51) Int. Cl.[7] ........................ H04N 5/225; H04N 5/222; H04N 7/18; G03B 17/00
(52) U.S. Cl. .................. 348/376; 348/333.03; 348/373; 348/158; 348/151; 348/78; 396/427
(58) Field of Search ............................ 348/333.03, 373, 348/376, 78, 220.1, 151, 158, 211.14, 340; 396/424, 427, 433

(56) References Cited

U.S. PATENT DOCUMENTS

| | | | | |
|---|---|---|---|---|
| 3,542,457 A | * | 11/1970 | Balding et al. | 351/206 |
| 4,109,145 A | * | 8/1978 | Graf | 250/201 |
| 4,516,157 A | * | 5/1985 | Campbell | 348/376 |
| 4,946,271 A | * | 8/1990 | Palsgard et al. | 351/209 |
| 5,579,048 A | * | 11/1996 | Hirasawa | 348/333.02 |
| 5,734,424 A | * | 3/1998 | Sasaki | 348/220 |
| 5,758,201 A | * | 5/1998 | Watanabe et al. | 396/51 |
| 5,857,121 A | * | 1/1999 | Arai et al. | 348/78 |
| 5,886,739 A | * | 3/1999 | Winningstad | 348/158 |
| 5,923,908 A | * | 7/1999 | Schrock et al. | 396/85 |
| 5,970,258 A | * | 10/1999 | Suda et al. | 396/51 |
| 5,990,954 A | * | 11/1999 | Kobayashi et al. | 348/333.03 |
| 6,246,437 B1 | * | 6/2001 | Kaneda | 348/333.03 |
| 6,549,231 B1 | * | 4/2003 | Matsui | 348/151 |

FOREIGN PATENT DOCUMENTS

| | | | | |
|---|---|---|---|---|
| JP | 09-066527 A | * | 9/1998 | G06F/3/033 |
| JP | 2000-101898 A | * | 4/2000 | H04N/5/232 |
| JP | 2000-138858 A | * | 5/2000 | H04N/5/232 |

OTHER PUBLICATIONS

Mann; "WearCam (The Wearable Camera)"; Digest of Papers for Second International Symposium on Wearable Computers, IEEE; 1998.*

* cited by examiner

Primary Examiner—Wendy R. Garber
Assistant Examiner—John M Villecco
(74) Attorney, Agent, or Firm—Birch, Stewart, Kolasch & Birch, LLP

(57) ABSTRACT

Motion of a user's line of sight is detected. If motion of the user's line of sight stops for a period of time greater than a fixed period of time, a shutter-release operation is performed. Image data representing the image of a subject obtained by shutter release is recorded on a memory card. This makes it possible to record image data on the memory card without pressing a shutter-release button.

2 Claims, 6 Drawing Sheets

METHOD AND APPARATUS FOR DETECTING AND RECORDING IMAGES

BACKGROUND OF THE INVENTION

1. Field of the Invention

This invention relates to an image sensing apparatus and method for picking up the image of a subject and recording an image signal (inclusive of digital image data and an analog video signal), which represents the image of the subject, on a recording medium.

2. Description of the Related Art

A camera (inclusive of a digital still camera which records image data representing the image of a subject on a memory card or the like, and a movie camera which records a moving signal representing the image of a subject on magnetic tape) is provided with a shutter-release button and a shutter switch, etc., and records digital image data and an analog video signal, which represent the image of the subject, on a recording medium in response to pressing of the shutter-release button.

In any case, an image signal representing the image of a subject will not be recorded on a recording medium unless a shutter-release operation is performed by the user (e.g., unless the shutter-release button is pressed by the user's finger).

DISCLOSURE OF THE INVENTION

Accordingly, an object of the present invention is to so arrange it that an image signal representing the image of a subject can be recorded on a recording medium without having a user press a shutter-release button.

According to a first aspect of the present invention, the foregoing object is attained by providing an image sensing apparatus comprising: an image sensing device for sensing the image of a subject, which is located ahead of the photographer on the line of sight of the photographer, and outputting an image signal representing the image of the subject; a halt detector for detecting that motion of the line of sight of the photographer has halted; and a recording controller for performing control in such a manner that the image signal output from the image sensing device will be recorded on a recording medium in dependence upon detection of halting of motion of the line of sight of the photographer by the halt detector.

The first aspect of the present invention provides also a method suited to the above-described apparatus. Specifically, the method comprises the steps of: sensing the image of a subject, which is located ahead of the photographer on the line of sight of the photographer, and outputting an image signal representing the image of the subject; detecting halting of motion of the line of sight of the photographer; and recording the image signal, which is obtained by sensing the image of the subject, on a recording medium in dependence upon detection of halting of motion of the line of sight of the photographer.

In accordance with the first aspect of the present invention, whether motion of the line of sight of the photographer has halted is detected. If the line of sight of the photographer has stopped moving, the image signal representing the image of the subject is recorded on a recording medium.

When the photographer does not press a shutter-release button, the image signal representing the image of the subject can be recorded on a recording medium. Thus, what the photographer is looking at can be recorded on the recording medium. For example, if photography is repeated over a fixed period of time, the action of the photographer can be recorded.

Motion of the photographer's line of sight over a distance that is less than a predetermined distance may be detected as halting of the line of sight. If the line of sight is not completely halted, the image of subject can be recorded.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

The image sensing apparatus comprises a line-of-sight detecting device 5, a camera unit 6 and a recording device 10.

Figure 1:
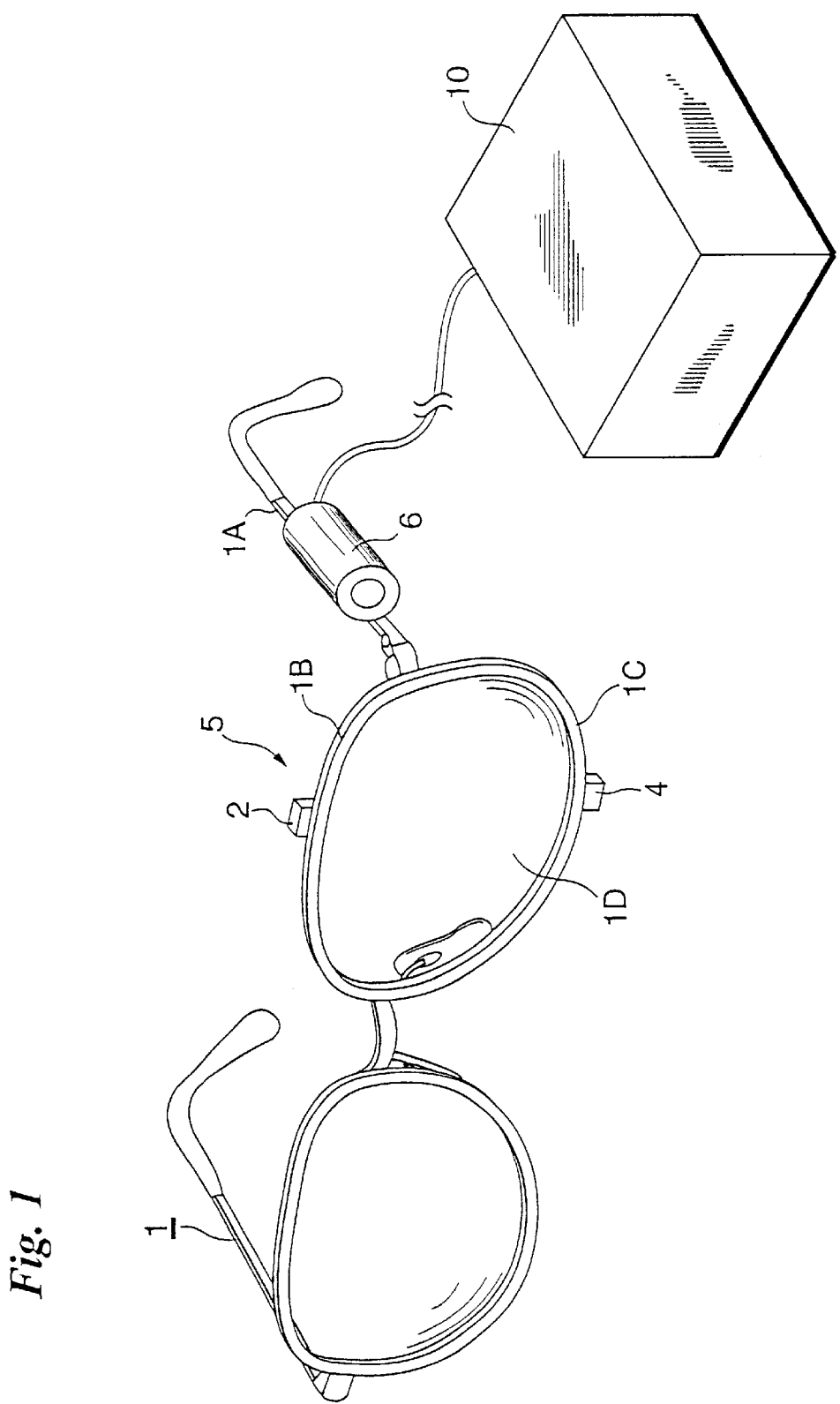
FIG. 1 is a perspective view of an image sensing apparatus according to an embodiment of the present invention.

The line-of-sight detecting device 5 is for detecting the line of sight of the user when the user wears an eyeglass frame 1. The line-of-sight detecting device 5 includes an infrared light-emission sensor 2 secured to a top rim 1B in which an eyeglass lens 1D has been fixed, an eyepiece 3 (which is not shown in FIG. 1), and a line-of-sight sensor 4 secured to a bottom rim 1C of the eyeglass frame 1.

The camera unit 6 is fixed to a temple piece 1A of the eyeglass frame 1. The direction in which the user is looking when the user puts on the eyeglass frame 1 is sensed by the camera unit 6. A video signal representing the image of a subject is output from the camera unit 6 and the output signal is applied to the recording device 10.

The recording device 10 converts the video signal output from the camera unit 6 to digital image data and stores the data on a memory card. More specifically, when the user's line of sight is halted for a fixed period of time, the image data representing the image of the subject is recorded on the memory card, as will be described later.

Figure 2:
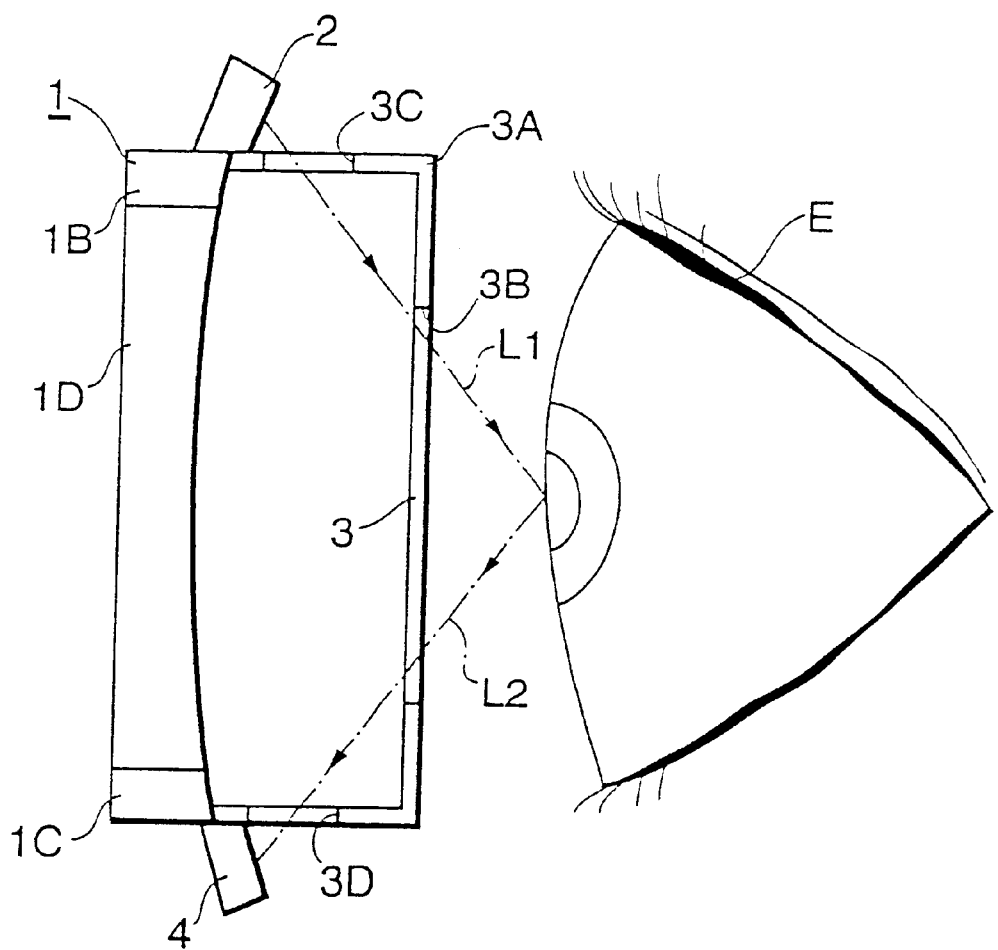
FIG. 2 is a diagram illustrating a line-of-sight detecting device that has been mounted on an eyeglass frame according to an embodiment of the present invention.

FIG. 2 illustrates the line-of-sight detecting device 5.

The line-of-sight detecting device 5 is constituted by the infrared light-emission sensor 2, the eyepiece 3 and the line-of-sight sensor 4.

The infrared light-emission sensor 2 is mounted on the top rim 1B of the eyeglass frame 1, and the eyepiece 3 is positioned by an opening 3B of a supporting frame 3A. When the user puts on the eyeglass frame 1, the eyepiece 3 is positioned in front of an eye E of the user. The line-ofsight sensor 4 is mounted on the bottom rim 1C of the eyeglass frame 1.

The infrared light-emission sensor 2 output infrared light L1. The infrared light L1 is focused on the surface of the user's eye E by the eyepiece 3 through an opening 3C in the supporting frame 3A. Reflected infrared light L2, namely infrared light reflected by the surface of the user's eye E, impinges upon the line-of-sight sensor 4 through an opening 3D in the supporting frame 3A. The angle of reflection of the infrared light L1 changes depending upon motion of the user's eye E. Since the position of the reflected infrared light L2 that impinges upon the line-of-sight sensor 4 changes, the direction in which the user is looking is detected. The line-of-sight sensor 4 outputs a line-of-sight detection signal that indicates the user's line of sight.

Figure 3:
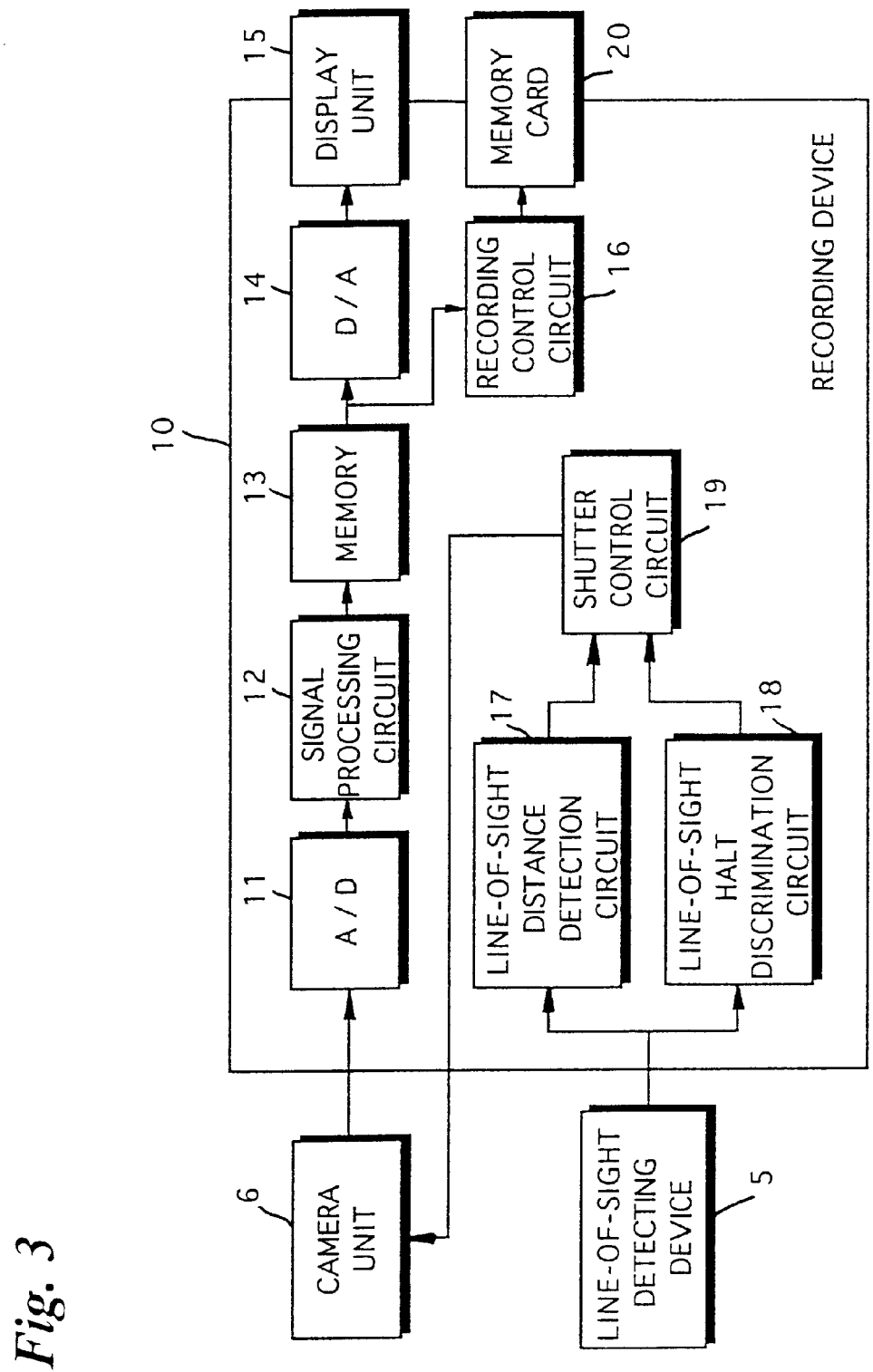
FIG. 3 is a block diagram illustrating the electrical construction of an image sensing apparatus according to an embodiment of the present invention.

FIG. 3 is a block diagram illustrating the electrical construction of the image sensing apparatus.

The image of a subject is captured at fixed time intervals (e.g., every 1/60 of a second) by the camera unit 6, and the video signal representing the image of the subject is output by the camera unit 6 and input to the recording device 10.

The video signal output from the camera unit 6 is converted to digital image data by an analog-to-digital conversion circuit 11 of the recording device 10. The digital image data is subjected to predetermined signal processing such as a white balance adjustment and gamma correction in a signal processing circuit 12. The image data output from the signal processing circuit 12 simply passes through a memory 13 and is applied to a digital-to-analog conversion circuit 14, where the signal is restored to an analog video signal. The analog video signal is applied to a display unit 15, whereby the image of the subject is displayed on the display screen of the display unit 15.

The line-of-sight detection signal output from the line-of-sight detecting device 5 is input to the recording device 10, as mentioned above. Here the line-of-sight detection signal enters a line-of-sight distance detection circuit 17 and a line-of-sight halt discrimination circuit 18. The line-of-sight distance detection circuit 17 detects the distance over which the user's line of sight moves. When motion of the line of sight over a distance greater than a predetermined threshold value is discriminated, the line-of-sight distance detection circuit 17 outputs a detection signal. The detection signal output from the line-of-sight distance detection circuit 17 is input to a shutter control circuit 19. Further, the line-of-sight halt discrimination circuit 18 determines whether motion of the user's line of sight has halted for a period of time greater than a fixed period of time. A signal indicative of the result of this determination is applied from the line-of-sight halt discrimination circuit 18 to the shutter control circuit 19.

The shutter control circuit 19 generates a shutter control signal based upon the detection signal output from the line-of-sight distance detection circuit 17 and the determination signal output from the line-of-sight halt discrimination circuit 18. The shutter control signal output from the shutter control circuit 19 is applied to the camera unit 6, where the shutter release of the camera unit 6 is controlled.

When the shutter is released, a video signal output from the camera unit 6 is converted to digital image data and the image data is stored temporarily in the memory 13, as mentioned above. The digital image data is read out of the memory 13 and is applied to a recording control circuit 16. The image data representing the image of the subject is recorded on a memory card 20 by the recording control circuit 16.

Figure 4:
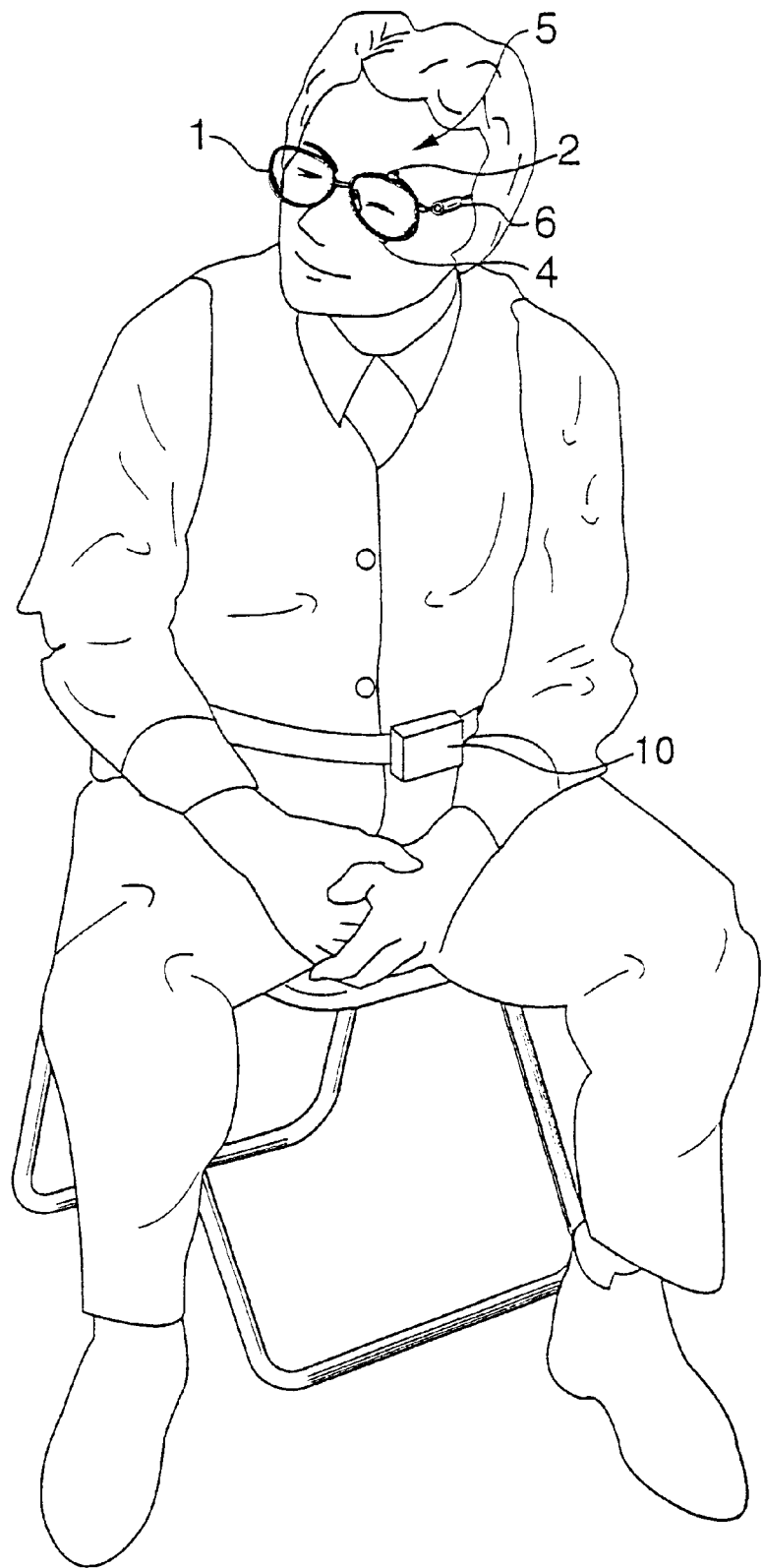
FIG. 4 is a diagram illustrating the manner in which the image sensing apparatus is used.

FIG. 4 illustrates the manner in which the image sensing apparatus is used by the user.

The eyeglass frame 1 to which the line-of-sight detecting device 5 and camera unit 6 have been secured is placed on the face of the user. The recording device 10 to which the line-of-sight detecting device 5 and camera unit 6 have been connected is fastened to the user's waist.

By thus placing the eyeglass frame 1 on the user's face, the camera 6 senses the image of a subject located in the direction in which the user is looking. If the user's line of sight stops moving, the image data representing the image of the subject that has been sensed is recorded on the memory card 20.

Figure 5:
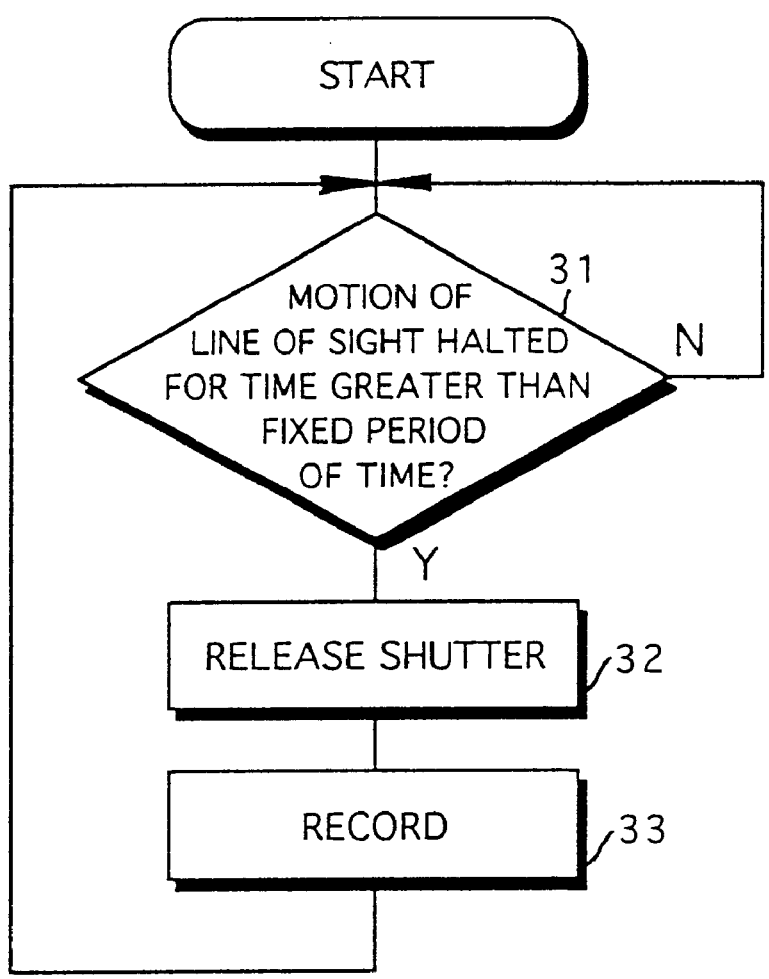
FIGS. 5 and 6 are flowcharts illustrating processing executed by the image sensing apparatus according to embodiments of the invention.

FIG. 5 is a flowchart illustrating processing executed by the image sensing apparatus for the purpose of recording image data according to an embodiment of the present invention.

First, the eyeglass frame 1 to which the line-of-sight detecting device 5 and camera unit 6 have been secured is placed on the face of the user. The power supply of the image sensing apparatus is turned on and the direction in which the user is looking is sensed periodically by the camera unit 6.

The line-of-sight detection signal representing motion of the user's line of sight is output from the line-of-sight detecting device 5 and is input to the line-of-sight halt discrimination circuit 18. The latter determines whether the user's line of sight has stopped moving for a period of time greater than a fixed period of time (step 31). If motion of the line of sight has halted for a period longer than the predetermined period of time ("YES" at step 31), the line-of-sight halt discrimination circuit 18 outputs the halt detection signal. This signal enters the shutter control circuit 19.

When this occurs, the shutter control circuit 19 outputs the shutter control signal, which is applied to the camera unit 6. The shutter in the camera unit 6 is released (step 32) and image data representing the image of the subject is recorded on the memory card 20 (step 33) in the manner described above.

It is then determined again (step 31) whether motion of the user's line of sight has halted for a period of time greater than the fixed period of time. Thus, processing for recording the image data representing the image of the subject is repeated whenever the user's line of sight stops moving.

Thus the shutter-release operation can be controlled without a shutter-release button being pressed by the user's finger or the like. Since the image of a subject being watched by the user is recorded at fixed time intervals, the action of the user over a fixed period of time can be recorded without the user being concerned about performing some operation.

Figure 6:
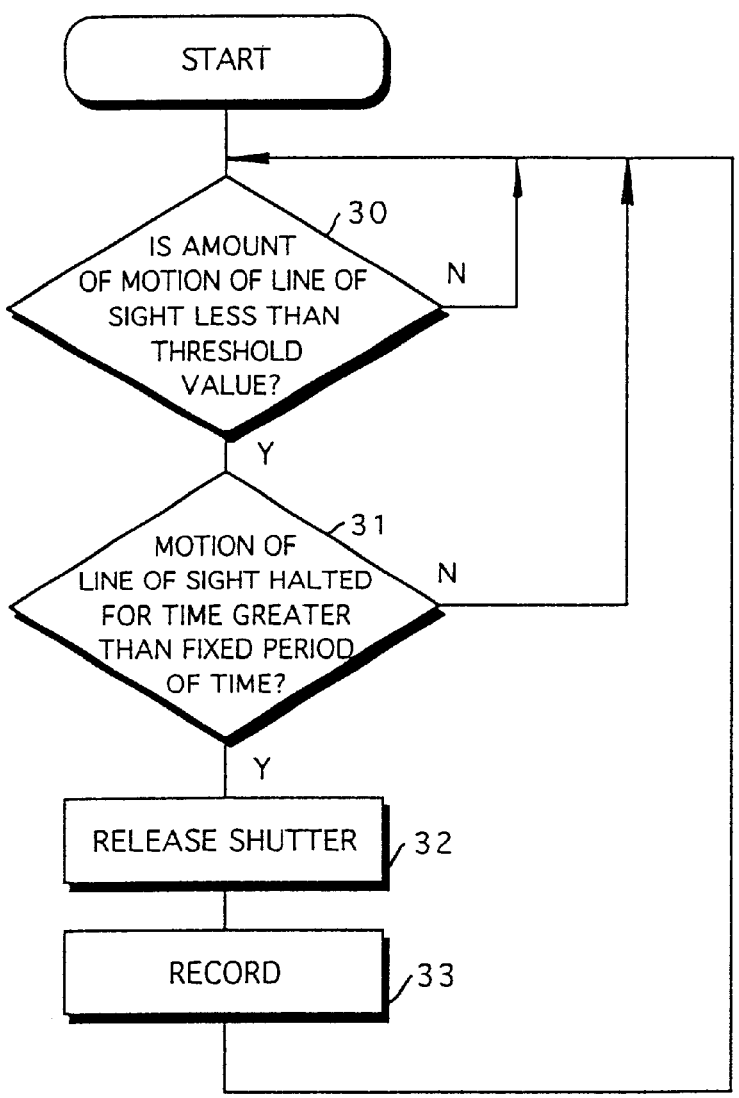

FIG. 6 is a flowchart illustrating processing executed by the image sensing apparatus for the purpose of recording image data according to another embodiment of the present invention processing steps in FIG. 6 identical with those shown in FIG. 5 are designated by like step numbers and need not be described again.

In the processing shown in FIG. 6, the amount of motion of the user's line of sight also is measured and it is determined whether the amount of motion is less than a predetermined threshold value (step 30).

If the amount of motion is less than a predetermined threshold value ("YES" at step 30) and motion of the user's line of sight has halted for a period of time greater than the fixed period of time ("YES" at step 31), the shutter is released by the shutter control circuit 19 (step 32).

Thus, an arrangement may be adopted in which shutter release is controlled based upon both the amount of motion of the line of sight and the length of time during which motion of the line of sight is halted. It goes without saying that the determination as to whether line of sight is at rest for longer than a fixed period of time may be performed by the line-of-sight halt discrimination circuit 18.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:

an image sensing device for sensing the image of a subject, which is located ahead of the photographer on the line of sight of the photographer, and outputting an image signal representing the image of the subject;

a halt detector for detecting that motion of the line of sight of the photographer has halted; and a recording controller for performing control wherein the image signal output from said image sensing device is recorded on a recording medium in dependence upon detection of halting of motion of the line of sight of the photographer by said halt detector, wherein said image sensing device and said halt detector are provided on an eyeglass frame.

2. The apparatus according to claim 1, wherein said halt detector is provided on an eyerim of the eyeglass frame.

* * * * *